United States Patent [19]

Tajima et al.

[11] Patent Number: 4,672,253

[45] Date of Patent: Jun. 9, 1987

[54] PERMANENT MAGNET ELECTRICAL MACHINE WITH REDUCED COGGING

[75] Inventors: Fumio Tajima, Jyuo; Hiroshi Katayama, Yokohama; Kunio Miyashita, Hitachi; Teizo Tamura, Katsuta; Kenichi Hironaka; Takuro Kawano, both of Hitachi; Yosimi Sekita, Toukai; Kouichi Saito, Kitaibaraki; Akira Tamura, Toukai, all of Japan

[73] Assignee: Hitachi, Ltd., Tokyo, Japan

[21] Appl. No.: 758,699

[22] Filed: Jul. 25, 1985

[30] Foreign Application Priority Data

| Jul. 25, 1984 | [JP] | Japan | 59-153070 |
| Jul. 25, 1984 | [JP] | Japan | 59-153056 |
| Aug. 24, 1984 | [JP] | Japan | 59-175027 |
| Aug. 29, 1984 | [JP] | Japan | 59-178325 |
| Oct. 15, 1984 | [JP] | Japan | 59-215694 |

[51] Int. Cl.$^4$ .............. H02K 21/00; H02K 29/00; H02K 1/14
[52] U.S. Cl. .............. 310/269; 310/49 R; 310/156
[58] Field of Search .............. 310/49, 51, 67 R, 154, 310/156, 162, 186, 216, 269

[56] References Cited

U.S. PATENT DOCUMENTS

| 4,112,319 | 9/1978 | Field | 310/49 R |
| 4,234,808 | 11/1980 | Geppert et al. | 310/156 |
| 4,280,072 | 7/1981 | Gotou et al. | 310/67 R |
| 4,516,048 | 5/1985 | Brigham | 310/156 |

FOREIGN PATENT DOCUMENTS

| 54-99908 | 7/1979 | Japan | 310/67 R |
| 55-71162 | 5/1980 | Japan | 310/269 |

Primary Examiner—Patrick R. Salce
Assistant Examiner—D. L. Rebsch
Attorney, Agent, or Firm—Antonelli, Terry & Wands

[57] ABSTRACT

A permanent magnet electric machine such as, for example, a motor or generator, including a permanent magnet field member, an armature having salient magnetic poles and armature windings. A greatest common division of the number of magnetic poles of the field member and the salient magnetic poles having the armature windings differs from the number of magnetic poles. A group of grooves is formed between the salient magnetic poles having an interval of $\frac{2}{3}M\pi$, with M being an integer which is not a multiple of three. To reduce the occurrence of cogging torque, auxiliary grooves are provided on the surface of the salient poles at positions which are spaced apart from positions of the grooves by $(\pi/3)K+(\pi/6)$, in terms of electrical angle, with K being an integer.

19 Claims, 46 Drawing Figures

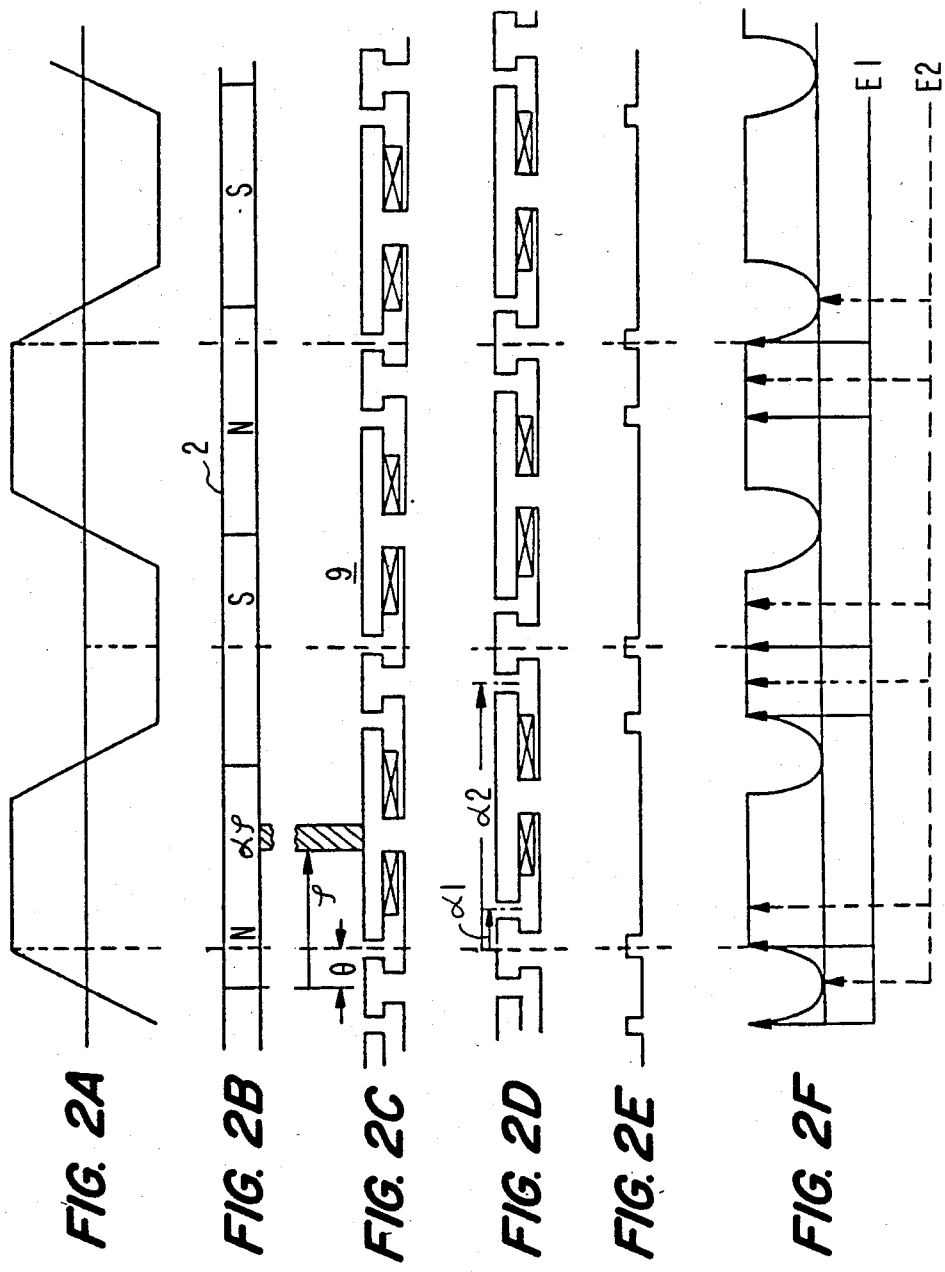

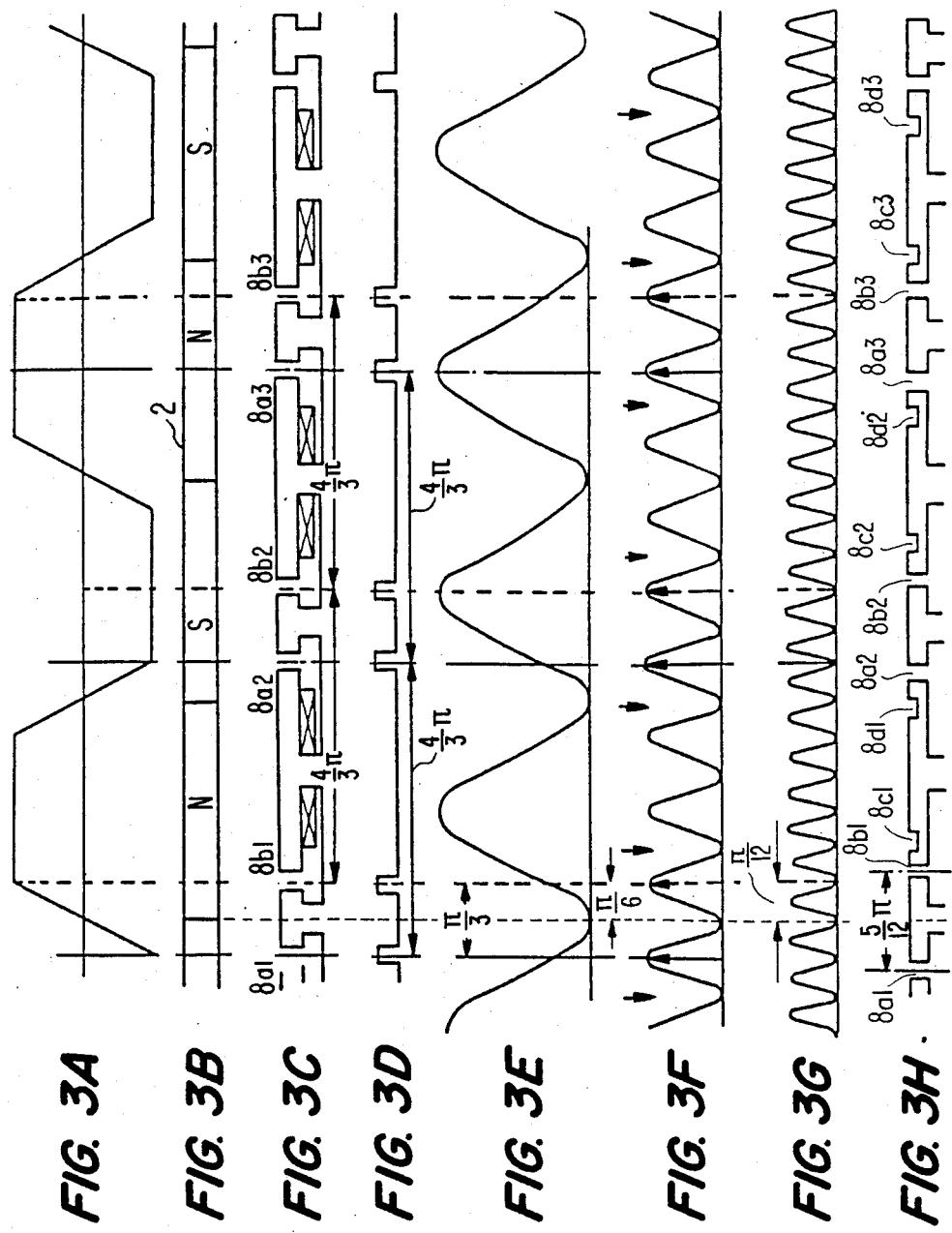

FIG. 4A
FIG. 4B
FIG. 4C

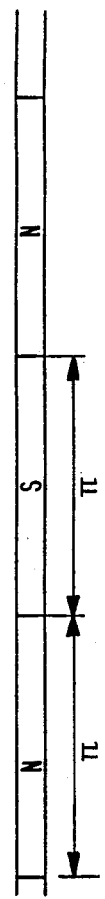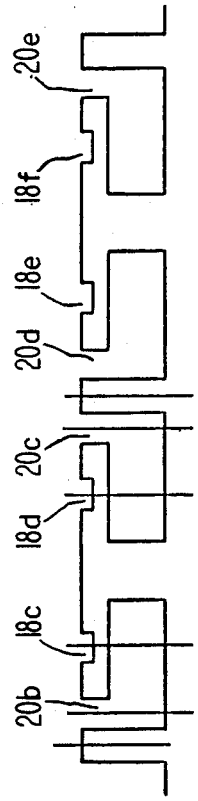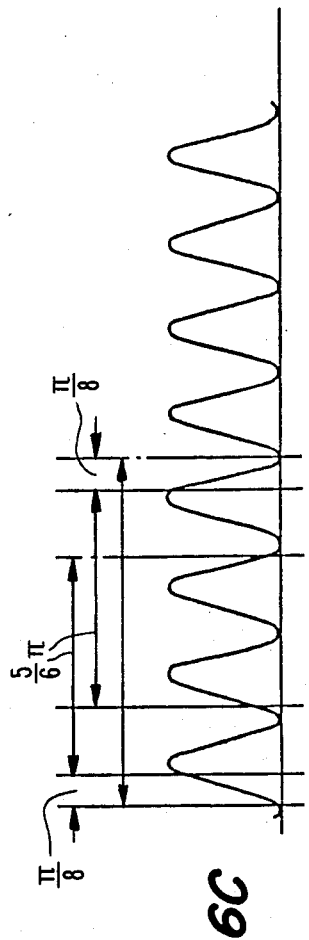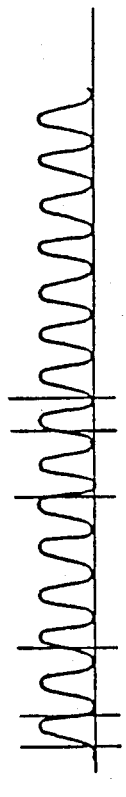
FIG. 6A
FIG. 6B
FIG. 6C
FIG. 6D

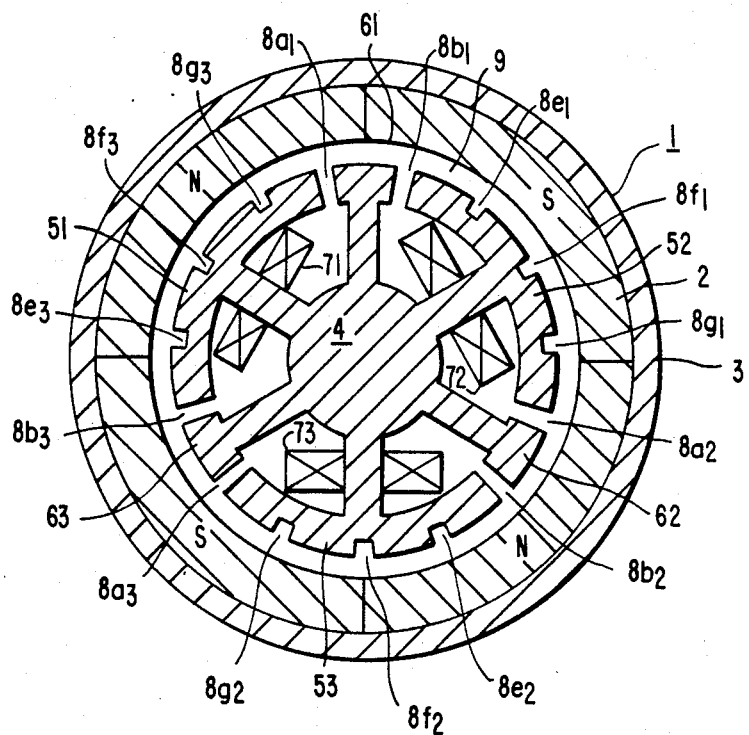

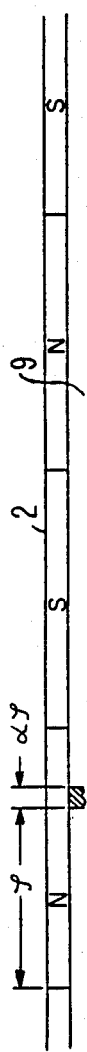
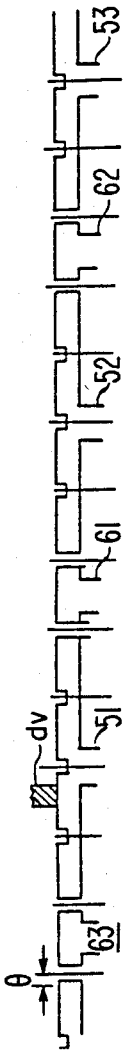
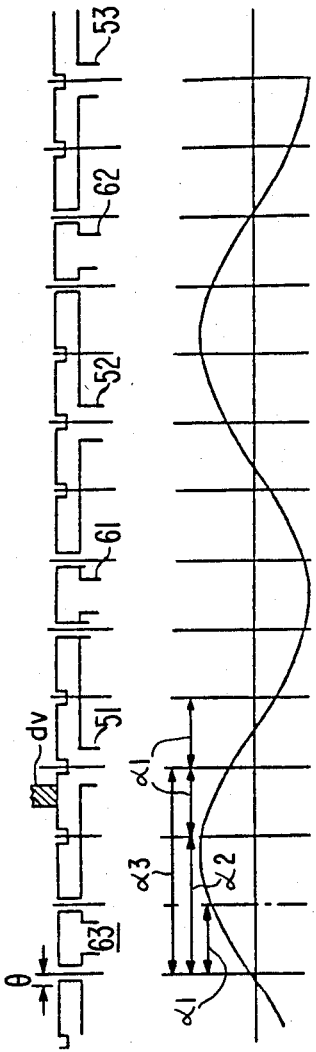
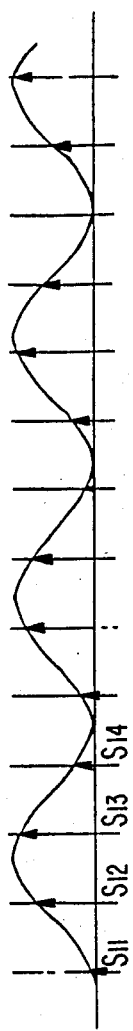
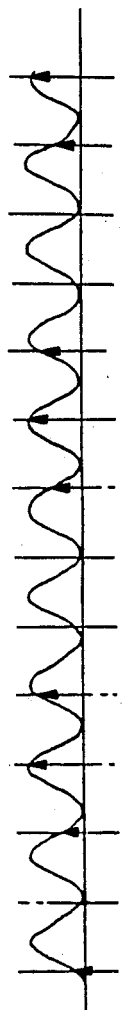
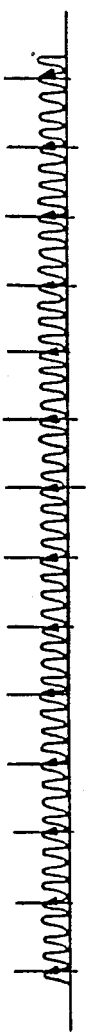
FIG. 8A
FIG. 8B
FIG. 8C
FIG. 8D
FIG. 8E
FIG. 8F
FIG. 8G

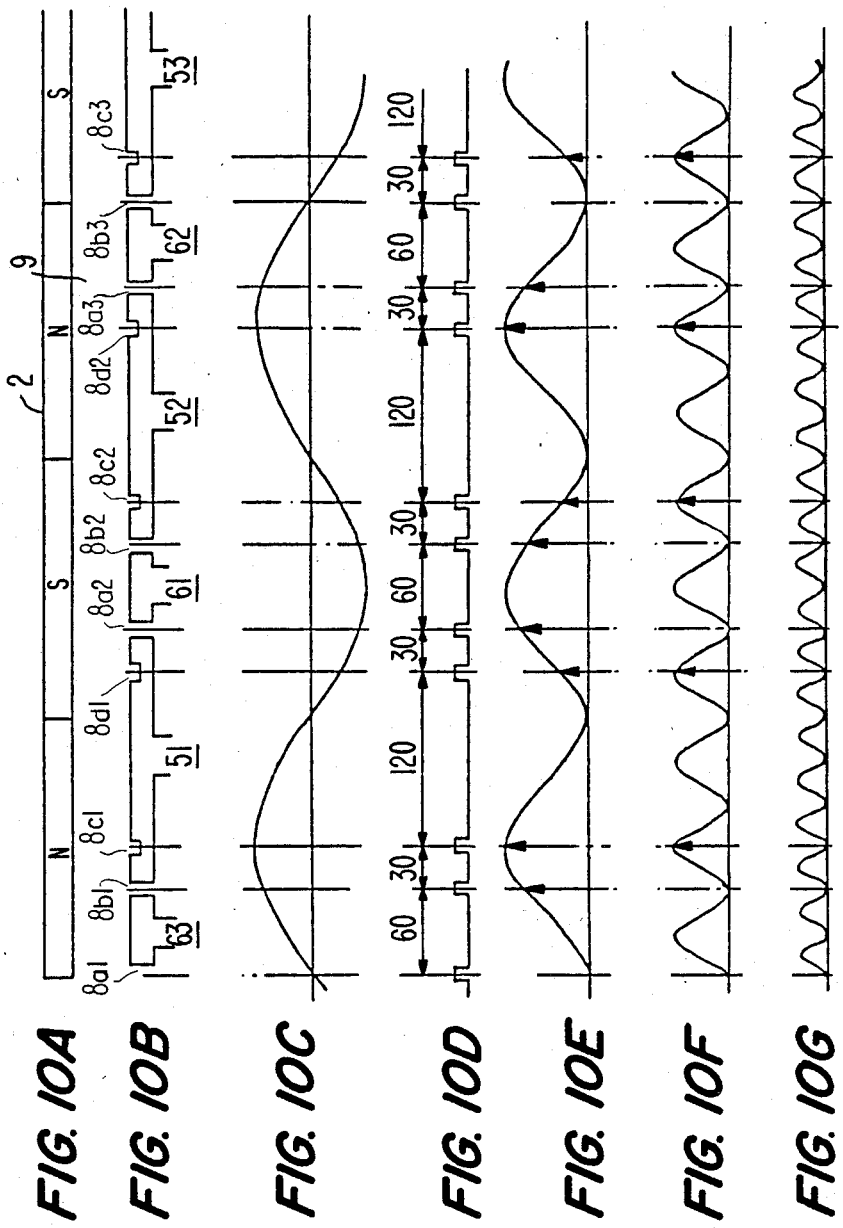

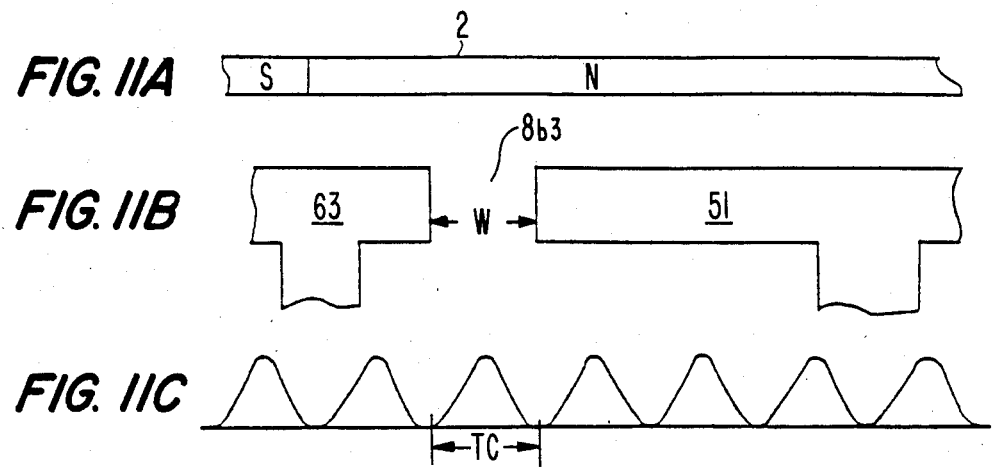
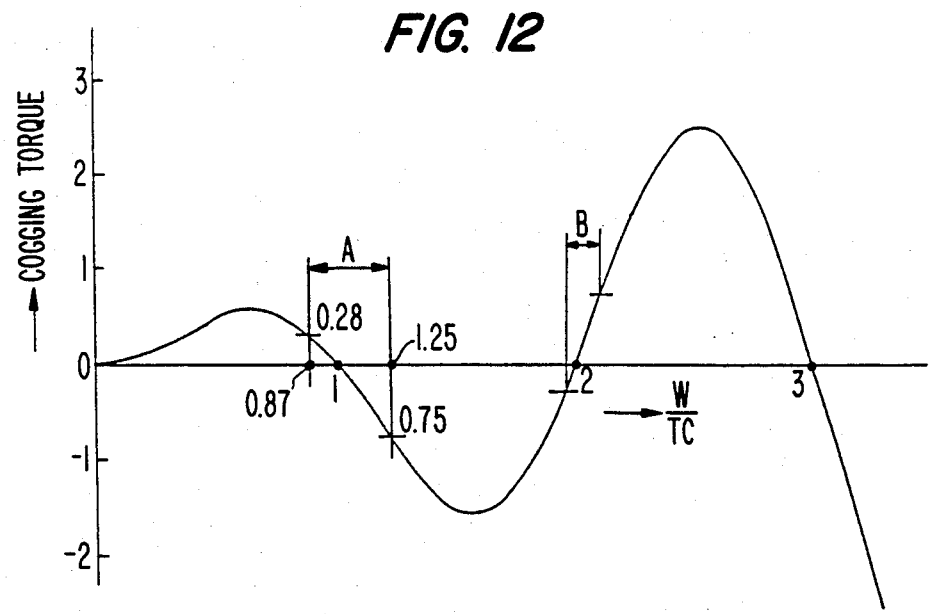

PERMANENT MAGNET ELECTRICAL MACHINE WITH REDUCED COGGING

BACKGROUND OF THE INVENTION

The present invention relates to a permanent magnet electric machine and, more particularly, to a permanent magnet electrical machine such as, for example, a motor or a generator, of a salient pole type which has a reduced cogging torque.

In electrical machines having salient magnetic poles, especially a brushless motor, a cogging torque occurs due to the salient pole structure and, for example in the U.S. Pat. No. 4,280,072, and Japanese Patent Publication No. 58-42708 an arrangement is proposed for reducing the cogging torque wherein auxiliary slots or grooves and grooves or slots for accommodating the windings are provided at equal intervals in surfaces of the salient magnetic poles, so as to render the degree number of harmonic components of the cogging torque higher, thereby reducing the cogging torque.

Generally, in addition to a cogging torque, a brushless motor also involves a ripple torque due to the fact that an induced voltage, i.e., a counter-electromotive force, of a brushless motor supplied by an inverter, as viewed from the input side of the inverter, the voltage has the same waveform as a full-wave rectification of an alternating current voltage which, as known, includes a ripple component causing a ripple in the torque produced by the brushless motor. Moreover, the ripple component is affected by the relationship between a pole pitch of a field and width of a salient pole of an armature. The pulsation rate of the cogging, in case of the providing of grooves or slots at equal intervals, becomes the same as at the least common multiple between the number of grooves or slots and the number of poles. Therefore, with the groove or slot arrangement at equal intervals, when three grooves or slots, including the winding groove or slot, are provided for one winding salient pole, in the case of three winding grooves among four poles, as described in, for example, the above noted U.S. patent, the circular measure of the magnetic pole is as small as 160°, and the cogging torque frequency is as low as thirty-six, so that the cogging torque is relatively high. With, for example, four grooves or slots, the cogging torque frequency is as low as twelve, and the cogging torque is great. With five or more grooves or slots, additional problems occur such as, for example, a loud wind noise due to the conspicuous lowering of magnetic flux magnitude attributed to the auxiliary groves or slots and the equal pitches of the grooves or slots.

The aim underlying the present invention essentially resides in providing a permanent magnet electric machine, such as a generator or motor, which is capable of substantially reducing the production of cogging torque.

More particularly, in accordance with advantageous features of the present invention, a permanent magnet electrical machine is provided which includes a permanent magnetic field member having a plurality of magnetic poles. An armature member is disposed in opposition to the field member and has a plurality of salient magnetic poles and armature windings wound to at least a portion of the salient magnetic poles. A greatest common division of the number of magnetic poles and number of salient magnetic poles wound by the armature winding differs from the number of magnetic poles. The armature member has at least one group of grooves or slots which are formed between neighboring or adjacent salient poles at electrical angular intervals of $\frac{2}{3}$, $\frac{2}{3}\pi$ with P being the number of pairs of magnetic poles of the field member which is not a multiple of three. The salient magnetic poles having auxiliary grooves on a surface opposite to the field member are separated from the grooves by an electric angle of $(\pi/3)K + (\pi/6)$, with K being an integer.

Preferably, to reduce the cogging torque, one group of the grooves and the auxiliary grooves is shifted from another group, in terms of an electrical angle, by $(\pi/12) \cdot L$, with L being an odd integer.

These and other objects, features, and advantages will become more apparent from the following description when taken in connection with the accompanying drawings which show, for the purposes of illustration only, one embodiment in accordance with the present invention, and wherein:

FIGS. 2A–2F are graphical illustrations of wave forms and developed views for explaining the principle of the occurence of a cogging torque;

FIGS. 3A–3H are graphical illustrations of wave forms and developed views for explaining the operation of the permanent magnet motor constructed in accordance with the present invention;

FIGS. 4A–4C are graphical illustrations of another embodiment of an armature portion for a permanent magnet motor constructed in accordance with the present invention;

FIGS. 6A–6D are graphical illustrations of developed views and wave forms for explaining an operation of the embodiment of FIG. 5;

FIG. 7 is a partially schematic cross-sectional view of yet another embodiment of a permanent magnet motor constructed in accordance with the present invention;

FIGS. 8A–8G are graphical illustrations and wave forms for explaining the operation of the embodiment in FIG. 7;

FIGS. 9A–9D are graphical perspective views and wave forms for explaining a skew angle according to the present invention;

FIGS. 10A–10G are graphical illustrations and wave forms for explaining another operation of the embodiment shown in FIG. 1;

FIGS. 11A–11C are graphical illustrations and a wave form diagram for explaining the relationship between width of a groove and period of the cogging torque; and FIG. 12 is a graphical illustration of the relationship between width of the grooves and period of the cogging torque.

DETAILED DESCRIPTION

Figure 1:
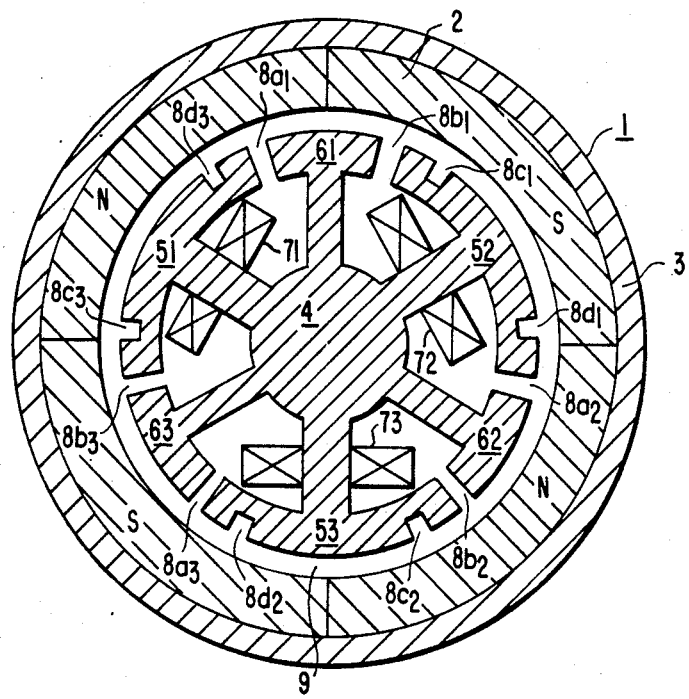
FIG. 1 is a schematic cross sectional view of an embodiment of a permanent magnet motor constructed in accordance with the present invention.

Referring now to the drawings wherein like reference numerals are used throughout the various views to designate like parts and, more particularly, to FIG. 1, according to this figure, a permanent-magnet field system generally designated by the reference numeral 1, in the form of a rotor, includes a ring-shaped permanent magnet 2, magnetized in four poles, and a yoke portion 3, with an armature 4 being formed by three salient poles 51, 52, 53 for windings and three auxiliary salient poles 61, 62, 63, in the form of a stator. Armature windings 71, 72, 73, are respectively wound around the winding salient poles 51, 52, 53. FIG. 1 provides an example of a motor of a construction wherein the number of poles of the permanent magnet 2 and the number of winding salient poles are four and three, respectively, and wherein the greatest common division of both the numbers differs from the number of poles of the permanent magnet. While the motor of FIG. 1 can be driven by mechanical commutation device, in the situation of a brushless motor, a continuous turning force is produced by switching the energizing operation to the armature windings 71, 72, 73, successively in accordance with the positions of the permanent-magnet field system or rotor 1.

As shown in FIG. 1, grooves or slots $8a_1$, $8b_1$, $8a_2$, $8b_2$, $8a_3$, and $8b_3$ for the windings are located between the salient magnetic poles. The arrangement of the grooves or slots is divided into two groups composed of the grooves or slots $8a_1$, $8a_2$, $8a_3$, and $8b_1$, $8b_2$, $8b_3$, which have intervals of $(4/3)\pi$, in terms of an electrical angle. Generally speaking, with respect to three salient poles, the adjacent grooves of slots has a relationship $\frac{2}{3}P\pi$ in terms of an electrical angle, where P is a number of pair of field poles, and, more generally, this relationship is represented by $(2\pi P/m)$, where m is the number of salient poles. The construction of FIG. 1 is a permanent magnet motor and is well suited for the principle of the present invention. Additionally, as further shown in FIG. 1, outer surfaces of the winding salient poles 51, 52, 53, disposed in opposition to the permanent magnet 2, are provided with auxiliary grooves or slots $8c_1$, $8c_2$, $8c_3$, $8d_1$, $8d_2$, and $8d_3$, each of which has substantially the same magnetic permeance as that of the winding groove or slot. In order to obtain the same magnetic permanence, a width of the auxiliary grooves may be wider than that of the winding grooves and, the present invention provides for an optimum arrangement of the winding grooves or slots and the auxiliary grooves in a manner described more fully hereinbelow.

With regard to the occurrence of a cogging torque in the motor of the type described hereinabove in connection with FIG. 1, as shown most clearly in FIGS. 2A–2F, generally, the cogging torque is incurred by virtue of the fact that the magnetic energy within an air gap portion 9 changes with the movements of the permanent magnetic poles 2, with the cause of the change of the magnetic energy lying in the grooves for the windings.

FIG. 2A provides a graphical illustration of the gap flux density in an arrangement of the permanent magnetic poles, FIG. 2C a peripheral developed view of the armature portion as shown in FIG. 2B. and FIG. 2D shows armature portion which has been relatively moved by a distance $\theta$ with respect to the field portion.

Referring to FIG. 2A–2D, the coupling torque is, in general, expressed by the following relationship: $T_c = -\partial E(\theta)/\partial \theta$, (1)
wherein,
$\theta$ = a movement angle of the armature portion relative to the permanent-magnet poles;
$E(\theta)$ = magnetic energy in the whole at the air gap.

The magnetic energy $\Delta E(\theta)$ per minute volume dv at an arbitrary angle $\phi$ in the gap may be determined by the following relationship:

$$\Delta E(\theta) = \frac{1}{2} \cdot \frac{1}{\mu_0} B_g^2(\phi \cdot \theta) \, dv \qquad (2)$$

$$= K_1 B_g^2 (\phi \cdot \theta) \, d\phi.$$

where:
$\mu_o$ = magnetic permeability of the air,
$B_g(\phi, \theta)$ = flux density of the gap, and
$K_1$ = a constant.

Accordingly, the magnetic energy $E(\theta)$ of the whole gap may be expressed as follows:

$$E(\theta) = K_1 \int_0^{p\pi} B_g^2(\phi, \theta) \, d\phi$$

where: p = number of field portion poles of the field portion.

Generally, the gap flux density $B(\phi)$, in the absence of grooves or slots, is decomposed into higher harmonic components and is expressed in accordance with the following relationship:

$$B(\phi) = \sum_{n=1}^{\infty} B_n \sin n\phi \qquad (4)$$

where: $B_n$ = a peak value of the higher harmonics of $B(\phi)$.

Additionally, an energy function $S(\phi)$ for the air gap portion (FIG. 2F) may be expressed by the following relationship:

$$S(\phi) = B^2(\phi) \qquad (5)$$

$$= \sum_{n=1}^{\infty} S_n(\phi)$$

$$= \sum_{n=1}^{\infty} (K_n + S_{an} \sin 2 n\phi)$$

where:
$S_n(\phi)$ = higher harmonics components of $S(\phi)$,
$K_n(\phi)$ = D.C. components of $S_n(\phi)$, and
$S_{an}$ = a peak value of the higher harmonics of $S_n(\phi)$.

As to the influences of the winding grooves or slots and the auxiliary grooves or slots on the flux density, it is considered that the gap flux density on the groove or slot portion will decrease or become null; therefore, the position of the slot portion of the unit may be defined in accordance with the following relationship (FIG. 2E):

$$u(X) = 1 \, \frac{-w}{2} < X < \frac{w}{2}$$

$$0 \, X < \frac{-w}{2}, \text{ or } X > \frac{w}{2},$$

Using the relationship above, the presence of the grooves or slots may be expressed by $u_f(\theta)$ in accordance with the following relationship:

$$u_f(\theta) = u(\theta + \alpha_1) + u(\theta + \alpha_2) + \ldots u(\theta + \alpha_{na}) \qquad (7)$$

$$= \sum_{n=1}^{na} u(\theta + \alpha_n)$$

where:

$\alpha_1, \alpha_2, \alpha_3, \ldots, \alpha_n$ represents the positions of the grooves or slots, and nd = the number of grooves or slots.

Accordingly, the profile of the flux density, with the grooves taken into consideration, may be expressed in accordance with the following relationship:

$$B_g(\phi \cdot \theta) = \{1 - u_f(\theta)\} B(\phi) \tag{8}$$

By substituting Equation (8) into Equation (3), the following relationship may be established:

$$E(\theta) = K_1 \int_0^{p\pi} \{1 - u_f(\theta)\}^2 B^2(\phi) d\phi \tag{9}$$

$$= K_1 \int_0^{p\pi} \{1 - u_f(\theta)\} B^2(\phi) d\phi$$

$$= K_1 \int_0^{p\pi} B^2(\phi) d\phi - K_1 \int_0^{p\pi} B^2(\phi) \cdot u_f(\theta) d\phi$$

Since the first term of Equation (9) is not a function of $\theta$, it exerts no influence on the cogging torque as set forth in the relationship of Equation (1) and, consequently, the cogging torque $T_c$ can be expressed in accordance with the following relationship:

$$T_c(\theta) = K_1 \frac{\partial}{\partial \theta} \int_0^{p\pi} B^2(\phi) u_f(\theta) d\phi \tag{10}$$

$$= K_1 \frac{\partial}{\partial \theta} \int_0^{p\pi} S(\phi) u_f(\theta) d\phi$$

In Equation (10) $S(\phi)$ represents an energy function in the absence of grooves. Furthermore, this may be reduced to the following relationship:

$$\int_0^{p\pi} S(\phi) \cdot u_f(\theta) d\phi = W \cdot \sum_{n=1}^{n\alpha} S(\theta + \alpha_n) \tag{11}$$

Accordingly, the cogging torque may be expressed by the fluctuations of the summation $E_1$ of the energy function $E(\theta)$ prior to movement and the summation $E_2$ after the movement in the energy function $E(\theta)$, as shown in FIG. 2F.

Although it is difficult to determine the fluctuations directly from FIG. 2F, it is possible to further develop Equation (11) in accordance with the following relationship:

$$\int_0^{p\pi} S(\phi) \cdot u_f(\theta) d\phi$$

$$= \int_0^{p\pi} \sum_{n=1}^{\infty} S_n(\phi) \cdot u_f(\theta) d\phi$$

$$= \sum_{n=1}^{\infty} \int_0^{p\pi} S(\phi) \cdot u_f(\theta) d\phi$$

$$= \sum_{n=1}^{\infty} W \cdot \sum_{n_1=1}^{n\alpha} S_n(\theta + \alpha_{n1})$$

-continued $$= \sum_{n=1}^{\infty} W \cdot \sum_{n_1=1}^{n\alpha} \{K_n + S_{an}\sin 2n(\theta + \alpha_{n1})\}$$

As apparent from Equation (12), the cogging torque may be decomposed into respective harmonic components, thereby indicating that the respective harmonic components of the cogging torque are given by the sum of the values of the groove portion parts of the energy functions of the same harmonic components, as the fluctuations.

Based upon the above theoretical observation, the embodiment of the present invention will be described more fully in connection with FIGS. 3A–3H, wherein FIG. 3A illustrates a gap flux density, FIG. 3B permanent-magnet poles, FIG. 3C the armature portion composed of only the winding grooves, FIG. 3D, a groove portion function thereof, and FIGS. 3E, 3F, and 3G, respectively, the fundamental harmonic, third harmonic component and sixth harmonic component of the energy function. The grooves or slots for the windings include the group $8a_1$, $8a_2$, and $8a_3$ and the group $8b_1$, $8b_2$, and $8b_3$, the phases of which respectively differ, in terms of an electrical angle, by $(4/3)\pi$.

When the fundamental harmonic component in Equation (12) is applied to the above two groups, the following relationship may be established:

$$\sum_{n_1=1}^{n\alpha} S_{a1} \sin 2 \cdot 1 \cdot (\theta + \alpha_{n1}) = \tag{13}$$

$$S_{a1}\left[\left\{\sin 2(\theta) + \sin 2\left(\theta + \frac{4}{3}\pi\right) + \sin 2\left(\theta + \frac{8}{3}\pi\right) + \right.\right.$$

$$\left\{\sin 2\left(\theta + \frac{\pi}{3}\right) + \sin 2\left(\theta + \frac{5}{3}\pi\right) + \right.$$

$$\left.\left.\sin 2\left(\theta + \frac{9}{3}\pi\right)\right\}\right] = \text{const}(=0)$$

As apparent from the above relationship, the cogging torque attributed to the fundamental harmonic component does not arise and, in general, a group of three grooves or slots having a groove or slot interval of $\frac{2}{3}P\pi$, with P being an integer which is not a multiple of three, can be proved by the same procedure as the above equation, and, with such arrangement, the generation of the cogging torque of the fundamental harmonic or the $(3n \pm 1)$-th harmonic component can be prevented.

In contradistinction, when the third harmonic component is considered, the following relationship holds:

$$\sum_{n_1=1}^{n\alpha} S_a^3 \sin \cdot 2 \cdot 3(\theta + \alpha_{n1}) = S_{a3} \cdot n\alpha \sin 6(\theta) \tag{14}$$

The third harmonic component of the energy function as represented by the equation (14) changes as shown in FIG. 3F. As apparent from FIG. 3F, the third harmonic components of the energy profile of the respective groove portions are in the same phase and are depicted by the upwardly directed arrows in FIG. 3F, that is, they are all at a peak value. Accordingly, cogging torque produced at only one groove portion cannot be cancelled by that produced at another groove portion so that, as a whole, a cogging torque is incurred.

In order to eliminate the occurrence of a cogging torque attributed to the third harmonic components, the present invention provides auxiliary grooves or slots shifted by electrical angles of $(\pi/6)+(\pi/3)K$, where K is an integer, from the positions of the grooves or slots for the windings. For example, in a simple manner, the auxiliary grooves or slots may be provided at positions indicated by downward arrows in FIG. 3F, wherein Equation (14) may be expressed as follows:

$$S_{a3} \cdot na \sin 6(\theta) + S_{a3} \cdot na \sin 6\left(\theta + \frac{\pi}{6} + \frac{\pi}{3} K\right), \quad (15)$$

whereby the cogging torque can be rendered null.

As can readily be appreciated, the arrangement of the auxiliary grooves or slots is not restricted to the specific arrangement described in connection with FIG. 3, and the auxiliary grooves or slots may be arranged at any other positions as long as the grooves or slots are shifted by $(\pi/6)+(\pi/3)K$ from the positions of the winding grooves. However, the intervals of the three auxiliary grooves or slots constituting one group must maintain electrical angles of $\frac{2}{3}P\pi$, with P being an integer which is not a multiple of three. With the above groove arrangement, the cogging torque becomes of higher orders and decreases to that extent.

With the arrangement of the winding grooves or slots and the auxiliary grooves or slots described hereinabove, the third harmonic component may be removed; however, the sixth harmonic component then comes into consideration. With regard to the sixth harmonic component, the groove or slot arrangement shown in FIG. 3F results in the following relationship:

$$S_{a6} na \sin 2 \cdot 6 (\theta) + S_{a6} \cdot na \cdot \sin 2 \cdot 6 \left(6 + \frac{\pi}{6} + \frac{\pi}{3} K\right) = \quad (16)$$

$$2 \, na \cdot S_{a6} \cdot \sin 2 \cdot 6\theta$$

The sixth harmonic component disappears when one of the groups of the winding grooves or slots and the auxiliary grooves or slots, the intervals of which are separated by $(\pi/3)K+(\pi/6)$, is shifted relative to the other groups by electrical angles of $(\pi/12)L$, where L is an odd integer.

In FIGS. 3C and 3H, the intervals between one group of winding grooves or slots $8a_1$, $8a_2$, and $8a_3$, as well as the auxiliary grooves or slots $8d_1$, $8d_2$, and $8d_3$, and the other group of winding grooves or slots $8b_1$, $8b_2$, and $8b_3$, as well as auxiliary grooves $8c_1$, $8c_2$, and $8c_3$, are shifted by $\pi/12$, whereby the fluctuations of the sixth harmonic component disappear or are voided.

With regard to the ninth harmonic component, it is possible to automatically eliminate the same by the grooves or slots for eliminating the third harmonic component; however, while the twelfth harmonic component remains as the other higher order component, the twelfth harmonic component is not of any consequence or serious problem. With an arrangement such as proposed by the present invention, the cogging torque can be sharply reduced.

It has been experimentally confirmed that the cogging torque in the present invention decreases to 1/6 of that of a motor having no auxiliary grooves. When the armature of the field portion is skewed in accordance with the twelfth harmonic component, the cogging torque is further reduced by the least skew angle. Preferably, the skew angle in the above-described embodiment is an electrical angle of $\pi/12$, with the method of determining the skew angle being described more fully hereinbelow.

While, the arrangement and construction of the grooves or slots shown in FIG. 1 have been explained in detail, as can readily be appreciated, other groove or slot arrangements are also possible. More particularly, FIGS. 4A–4C provide graphical illustrations of such additional embodiments, with such figures providing variations of the groove positions of a basic structure.

Figure 5:
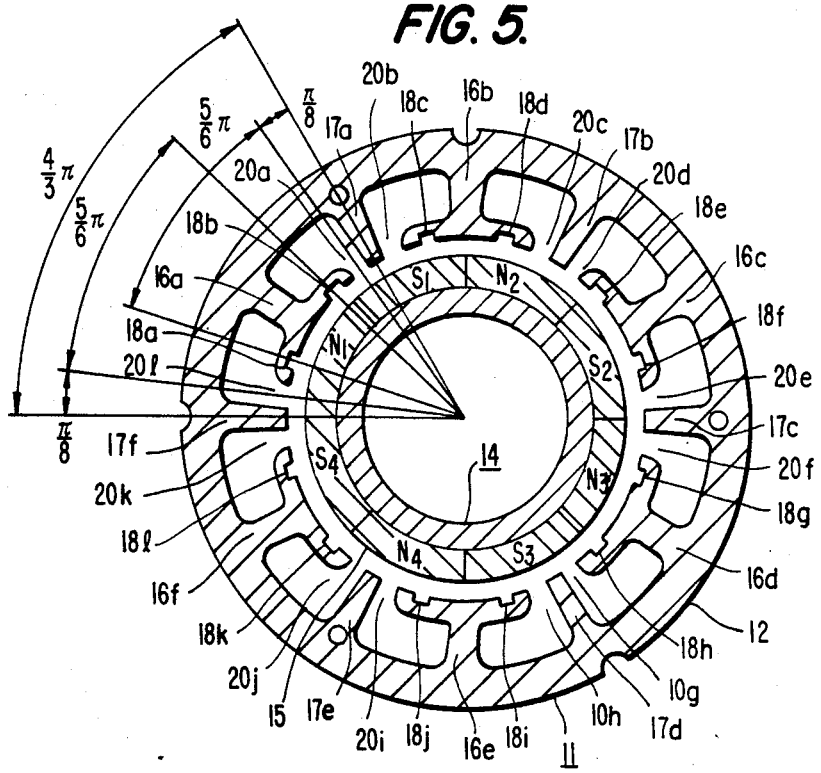
FIG. 5 is a partially schematic cross-sectional view of yet another embodiment constructed in accordance with the present invention.

As shown most clearly in FIG. 5, in accordance with another embodiment of the present invention, an armature generally designated by the reference numeral 11 having an armature core 12, salient poles 16a–16f, and auxiliary poles 17a–17f. Although the embodiment of FIG. 5 has six salient winding poles 16a–16f, and, consequently, six armature windings, these windings are connected in a three phase connection. Surrounded by the winding and the auxiliary poles, a field system is provided generally designated by the reference numeral 14, which includes eight permanent magnet poles 15. On the surface of each of the winding poles 16a–16f, which faces the permanent magnets 15 of the field system 14, there are provided two auxiliary grooves 18a–8l, and the winding and the auxiliary poles form grooves 20a–20l. Although the relationship between the pole pitch of the field system 14 and the arrangement of the grooves in the armature 11 are somewhat schematically shown in FIG. 5, the details of such arrangement will be described more fully in connection with FIGS. 6A–6D, wherein the relationship is indicated in terms of an electrical angle.

As shown in FIG. 6B, auxiliary groove 18d has an opposite phase to the groove for the winding 20b for the third harmonic component (FIG. 6C) of the energy function, and the auxiliary groove 18c has an opposite phase to the groove for the winding 20c. Similarly, the twelve auxiliary grooves 18a–18l have the opposite phase relationship with the twelve grooves for the windings 20a–20l, and when viewed as a whole, they become constant regardless of the relative positions between the armature 11 and the field system 14 as to the third component of the energy function of the gap. Consequently, in the arrangement of FIG. 5, cogging does not occur.

With regard to the sixth harmonic component (FIG. 6D), the auxiliary groove 18c has an opposite phase to the groove for the winding 20b, as does the auxiliary groove 18d to the winding 20c. When viewed as a whole, the sixth component of the energy function of the gap becomes constant regardless of the relative position between the armature 11 and the field system 14 and, consequently, cogging does not occur.

As described above, when two auxiliary grooves 18a–18l are provided for each salient pole 16a–16f, the third and sixth components of the energy function may be reduced by suitably arranging the positions of the auxiliary grooves 18a–18l, and, consequently, the cogging torque may be reduced.

The manner of selecting the proper skew angle for the slots or grooves in an electric motor machine formed with auxiliary grooves or slots will now be described more fully hereinbelow.

As shown most clearly in FIG. 7, the salient magnetic poles 51, 52, and 53 includes auxiliary grooves $8e_1$, $8f_1$, $8g_1$, $8e_2$, $8f_2$, $8g_2$, $8e_3$, $8f_3$, and $8g_3$, each of which has substantially the same magnetic permeance as that of the winding grooves $8a_1$, $8b_1$, $8a_2$, $8b_2$, $8a_3$ and $8b_3$, with these grooves, including the winding grooves, being arranged at substantially equal intervals. As apparent from Equation (11), the cogging torque can be decomposed into respective harmonic components.

More particularly, FIG. 8A illustrates the permanent magnetic poles, FIG. 8B, the armature portion, FIG. 8C, the flux density, FIG. 8D, the groove position function, and FIGS. 8E, 8F, and 8G, the fundamental harmonic, third harmonic component, and sixth harmonic component of the energy function, respectively.

By way of example, the cogging torque attributed to the fundamental wave of the energy profile will be considered. More particularly, as shown in FIG. 8E, the values at the respective groove or slot positions are represented by $S_{11}$, $S_{12}$, $S_{13}$, ... and $S_{1n\alpha}$, indicated by the arrows in the figure, the summation of which does not become the function of $\theta$ but is constant in a situation wherein fifteen grooves or slots are arranged at equal intervals. Consequently, the cogging torque is null. Likewise, the summations are null for the second to fourteenth harmonics of the energy function; however, as to the fifteenth harmonic, the following relationship holds and it becomes a function of $\theta$, thereby causing a cogging torque:

$$\sum_{n_1=1}^{n\alpha} S_{a15} \sin 2 \cdot 15 (\theta + \alpha_{n1}) = n_\alpha S_{n15} \sin 2 \cdot 15 (\theta + \alpha_1)$$

where:
$\alpha_1 = 48°$;
$\alpha_2 = 96°$.

The above relationship is apparent from FIG. 8G and the fifteenth harmonic components are in phase at all of the groove or slot position parts and become a function of $\theta$.

From the above relationship, the frequency of the cogging torque is evaluated by $15 \times 4 = 60$. The pitch $1/S = 1/60$ of the cogging torque is obviously less than the slot pitch of $1/15$. Thus, by setting the pitch of the skew at $1/60$, the same effect can be obtained with a skew pitch which is smaller than $1/15$ as in the case of prior art constructions. The ripple torque can also be reduced due to the fact that the skew pitch can be selected so as to be smaller.

Generally, in a case where the number of poles of the permanent magnet is P, and where the total number of grooves or slots, the total number of which is $n_\alpha$, are arranged at equal pitches, the order n to incur the cogging torque is, in view of FIG. 3G, expressed in accordance with the following relationship:

$P\pi/n\alpha = K\pi/n.$

Accordingly, $n = (n\alpha/P) \cdot K,$ where: K = an arbitrary integer, a value of which can make n an integer.

Therefore, the cogging number $n_{TC}$ of one revolution is expressed by the following relationship:

$$n_{TC} = n \cdot P = \left(\frac{n\alpha}{P} \cdot K\right) \cdot P.$$

wherein: the value of $$\left(\frac{n\alpha}{P} \cdot K\right)$$

is an integer.

As apparent from the above equation, $n_{TC}$ is the least common multiple between the number of grooves or $n_\alpha$ and the number of poles of the permanent magnet P.

Consequently, the cogging frequency $n_{TC}$ is greater than $n_\alpha$, and the minimum required skew pitch S may be set at a pitch of $1/L$ of the harmonic order n of the energy function causing the cogging torque. Accordingly, the selection of the skew angle permits the skew pitch to be less than the prior art skew pitch $1/n_\alpha$ so that the ripple torque component can be significantly reduced.

In summary, in a case where the skew pitch $1/S$ of the permanent magnet field system or the armature is substantially equal to the pitch $1/L$, which is the inverse number of the value of the least common multiple L between the total number K of the grooves and the number P of the poles of the permanet magnet, the cogging torque can be maximally reduced with the smallest skew angle. On the other hand, with regard to the skew angle, only the situation where both $1/S$ and $1/L$ are in agreement is not restrictive, but an effect is produced, in general, subject to the conditions of $0.5/L < 1/S < 1.5/L$.

FIG. 9B provides an illustration of a construction of one embodiment in accordance with the present invention, wherein the number of the slots $n_\alpha$ is equal to fifteen, the number P of the poles of the permanent magnet is four, and the pitch of the skew angle is set at $1/60$ of the whole circumference, which is less than or smaller than the slot interval $1/15$.

FIGS. 10A–10G provide an example of another embodiment of the present invention, wherein FIG. 10A illustrates the permanent magnet poles FIG. 10B, the armature portion FIG. 10C of the air gap portion, and the flux density, FIG. 10D, the groove position function. Further, FIGS. 10E–10G show the fudamental harmonic, third harmonic component, and sixth harmonic component, of the energy function, respectively. In this connection, FIGS. 10A and 10B show the field system and the armature obtained by developing the same of FIG. 1 in a circumferential direction. The pitches of the winding grooves $8a_1$, $8b_1$, $8a_2$, $8b_2$, $8a_3$, and $8b_3$ and auxiliary grooves or slots $8c_1$, $8d_1$, $8c_2$, $8d_2$, $8c_3$, and $8d_3$ are indicated as the position function as shown in FIG. 10D.

The summations of the respective harmonic components of the energy function at the portions of the grooves will be described more fully hereinbelow.

As to the fundamental wave component of FIG. 10E, the following relationship exists:

$$\sum_{n_1=1}^{n\alpha} S_{a1} \sin 2 (\theta + \alpha_{n1}) = (0)$$

where: $\alpha_1-\alpha_{12}$ represents groove or slot positions shown in FIG. 10D.

As has been described, the values for the second-fifth harmonics, i.e., $3n\pm1$ harmonic, become null. Regarding the third harmonic, the magnitudes of the component differ by 180 degrees between the adjoining slot positions as shown in FIG. 10F. For example, the value of the third harmonic at the portion of the groove $8b_1$ is minimum and at the portion of the groove $8c_1$ is maximum. As apparent from FIG. 10F, the same is true of every pair of adjoining groove portions. Accordingly, it is apparent that, as a whole, the summation of the third harmonic component of the energy function becomes null.

With regard to the sixth harmonic, as illustrated in FIG. 10G, the following relationship exists:

$$\sum_{n_1=1}^{n\alpha} S_{ab} \sin 2 \cdot 6 (\theta + \alpha_{n1}) = 12 S_{ab} \sin 2 \cdot 6 (\theta + \alpha_1) = (0)$$

Accordingly, the pulsation rate of the cogging torque is twenty-four pulsations/revolutions as a product between the 6th order of the harmonics and four poles. Under these conditions, the skew angle is usually selected so as to be $2\pi/24$ (mechanical angle). That is, in a situation where the slot pitches $60°:30°:120°:30°: \ldots :30°$ are electrical angle roughly converted into integers $2:1:4:1:\ldots:1$, summation of all the terms of this ratio is twenty-four, and the least common multiple twenty-four between this summation and the number of poles represents the cogging pulsation rate, so that the skew may be carried out in accordance with this pitch. In general, when slot pitches are expressed by $\alpha_1:\alpha_2:\ldots:\alpha_n$, it is preferable to roughly convert these pitches into integers $M_1, M_2, M_3, \ldots$ and $M_{n\alpha}$, and to perform the skew at the period of the least common multiple L between the summation $$N_R = \sum_{R=1}^{n\alpha} M_R,$$

and the number of poles p of the permanent magnet.

Accordingly, in a situation with a groove arrangement such as illustrated in FIG. 3H, the groove pitches $(5/12)\pi:(\pi/6):(7/12)\pi:(\pi/6):\ldots(\pi/6)$ are roughly converted into integers $5:2:7:2:\ldots2$, the summation of all the terms becomes forty-eight, and the least common multiple forty-eight between this summation and the number of poles represents the cogging pulsation rate. Therefore, the skew may be performed at a pitch of $2\pi/48$ (mechanical angle) of the whole circumference, that is, by an electrical angle $\pi/12$.

While specific examples have been set forth hereinabove, it is understood that the concept of the present invention is not restricted to only the foregoing specific examples, but rather the subject matter of the present invention is effective when the number of poles, the number of grooves or slots, the intervals of the grooves or slots, etc., have changed or regardless of whether or not auxiliary salient poles exist. More particularly, in accordance with the present invention, even when grooves are arranged at unequal intervals, it is possible for similar functions and effects to be achieved. Moreover, as noted above, in accordance with the present invention, an appropriate skew angle is selected so as to be the smallest whereby both the cogging torque and a rippling torque can be reduced.

As to the preferred width of the grooves, when the cogging torque becomes small to the extent of the magnitude caused by the twelfth harmonic component, the influence of the groove or slot width appears, and the component of the twelfth order in Equation (12) may be expressed in accordance with the following relationship:

$$wS_{15}(\phi) \sum_{n_1=1}^{n\alpha} u(\theta + \alpha_{n1}) = w \cdot 15 \cdot S_{12}(\phi) \cdot u(\theta),$$

and, as apparent from the definition of u:

$$= w \cdot 15 \int_{\theta - \frac{W}{2}/\tau_p \cdot \pi}^{\theta + \frac{W}{2}/\tau_p \cdot \pi} S_{15}(\phi) d\phi \quad (21)$$

$$= w \cdot 15 \int_{\theta - \frac{W}{2}/\tau_p \cdot \pi}^{\theta + \frac{W}{2}/\tau_p \cdot \pi} S_{a15} \cdot \cos 2 \cdot 15 \cdot \phi d\phi$$

where: $\tau_p$ represents a circumferential pitch of the permanent magnet poles, i.e., pole pitch of the field system, and:

$$= 12 \cdot w \cdot S_{a12} \left\{ \sin 24 \left( \theta + \frac{W}{2}/\tau_p \cdot \pi \right) - \sin 24 \left( \theta - \frac{W}{2}/\tau_p \cdot \pi \right) \right\} \quad (22)$$

$$= 12 \cdot w \cdot S_{a12} \cdot 2 \cos 24 \cdot \theta \cdot \sin 12 \cdot w/\tau_p \cdot \pi$$

Further, where i is a positive integer, the following relationship holds, wherein theoretically the value of equation (22), and therefore, the cogging torque, becomes null:

$$\frac{w}{2}/\tau_p \cdot 24 \cdot \pi \quad (23)$$

$$w = \frac{\tau_p}{12} \cdot i$$

As apparent from the foregoing, in general, the following relationship exists:

$$w = (\tau_p/n) \cdot n = \tau_c \cdot i \quad (24)$$

where: n represents the order of harmonic component.

Accordingly, the cogging torque can theoretically be null by setting the groove or slot width w at a positive integral multiples of the period $t_c$ of the pulsations of the cogging torque. FIGS. 11A-11C illustrate a case where the cogging period $\tau_c$ is brought into agreement or correspondence with the groove or slot width w. In this connection, FIG. 11A illustrates the permanent magnet poles, FIG. 11B the armature portion, and FIG. 11C, the cogging torque.

Generally, the groove or slot width w described above is not restricted to only the positive integral times the period $\tau_c$ of the cogging torque, but the surrounding range thereof is satisfactorily usable because the cogging torque is sufficiently small in such surrounding range.

In view of Equation (22), the maximum value of n-th order cogging torque $\tau_{cn}$ may be expressed as follows:

$$T_{cn} = K_2 \cdot w \cdot \sin \frac{n \cdot w}{\tau_p} \cdot \pi$$

$$= K_3 \cdot \frac{w}{\tau_p} \cdot \sin n \cdot \frac{w}{\tau_p} \cdot \pi$$

$$= K_4 \cdot \frac{w}{\tau_c} \cdot \sin \frac{w}{\tau_c} \cdot \pi$$

The above relationship is illustrated in FIG. 12 and, as apparent from the figure, the cogging torque becomes null at $i = \tau_c$, where i is a positive integer.

Generally, as illustrated in FIG. 12, the effect of the present invention may be achieved by selecting $w/\tau_c$ in a range of between 0–1 so as to lie in a range of a value of ½ of the maximum value or, in the figure, about 0.56, of the cogging torque, while, with $w/\tau_c$ being in the range of 1–2, the effect of the present invention is similarly achieved by selecting it so as to lie in a range of ½ of the maximum value, that is, 1.5 in the figure, of the cogging torque. Consequently, an area near a value wherein $w/\tau_c = 1$, the range A of the present invention for the reduction of the cogging torque becomes $0.87 < w/\tau_c < 1.25$.

However, the range B of the same value for $w/\tau_c = 2$ similarly becomes one such as shown in FIG. 12. Generally, as $w/\tau_c$ equals 1, 2, 3, ..., a tangential line becomes 1, 2, 3, ..., so that the range becomes 1/1, 1/2, 1/3 .... Accordingly, for $w/\tau_c = 1$, the following relationship exists:

$$0.87\tau_c \leq w \leq 1.25\tau_c$$

$$\tau_c - 0.13\tau_c \leq w \leq \tau_c + 0.25\tau_c$$

for $w/\tau_c = 2$, the following relationship exists:

$$2\tau_c - (0.13/2)\tau_c \leq w \leq 2\tau_c + (0.25/2)\tau_c$$

and for $w/\tau_c = i$, the following relationship exists:

$$i\tau_c - (0.13/i)\tau_c \leq w \leq i\tau_c + (0.25/i)\tau_c$$

By selecting an appropriate slot width within the above range, it is possible to sufficiently reduce the cogging torque in a practical manner.

While we have shown and described several embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A permanent magnet electric machine comprising:
   a field member having at least one pair of magnetic poles, each including a permanent magnet; and
   an armature member disposed in opposition to said field member having a plurality of salient winding poles around which armature widings are wound;
   a greatest common divisor of the number of said magnetic poles of said field member and a number of said salient magnet poles differing from the number of the magnetic poles of said field member;
   winding grooves formed by two adjacent salient winding poles at an electrical angular interval of $\frac{2}{3}P\pi$, where P is a number of pairs of the magnetic poles of said field member which is not a multiple of three; and
   wherein each salient pole is provided in a surface thereof facing the magnetic poles of said field member, with auxiliary grooves at positions of the winding grooves in terms of an electrical angle by $(\pi/3)K + (\pi/6)$ where K is an integer and at positions spaced by $(\pi/12)L$ from the respective winding and auxiliary grooves in terms of an electrical angle, where L is an odd integer.

2. A permanent magnet electric machine according to claim 1, wherein the number of said auxiliary grooves is equal to the number of said first grooves.

3. A permanent magnet electric machine according to claim 1, wherein said salient magnetic poles include winding salient poles wound by said winding and auxiliary salient poles provided between said winding salient poles.

4. A permanent magnet electric machine according to claim 3, wherein the number of said auxiliary grooves is equal to the number of said first grooves.

5. A permanent magnet electric machine according to claim 1, wherein a width of each of said grooves and said auxiliary grooves is substantially n times a period of a cogging torque, with n being an integer.

6. A permanent magnet electric machine according to claim 1, wherein said armature member is skewed by a pitch of $\pi/12$ in terms of an electrical angle.

7. A permanent magnet electric machine according to claim 1, wherein said permanent magnet field member is skewed by a pitch of $\pi/12$ in terms of an electrical angle.

8. A permanent magnet electric machine according to claim 1, wherein a relationship of $0.5/L < 1/S < 1.5/L$ exists when ratios of pitches of said auxiliary grooves and said grooves, as located between the salient magnetic poles, are approximated as integers $M_1, M_2, M_3, \ldots M_{na}$, where na equals a total number of said grooves and said auxiliary grooves over a whole circumference, and wherein L represents a least common multiple between a summation of the integers $$N_R = \sum_{R=1}^{na} M_R$$

and the number of magnetic poles, and wherein a skew pitch between said permanent magnet field member and said armature member is 1/S of the whole circumference.

9. A permanent magnet electric machine according to claim 8, wherein 1/S and 1/L are equal.

10. A permanent magnet electric machine according to claim 5, wherein said width is established in accordance with the following relationship:

$$n T_c - (0.73 T_c/n) < W < n T_c + (0.25 T_c/n).$$

11. A permanent magnet motor comprising:
    a field member of a circular configuration having at least one pair of magnetic poles, each including a permanent magnet;
    an armature member disposed in opposition to and coaxial with said field member and having a plurality of salient winding poles, around which armature windings are wound, and auxiliary salient poles so provided that each auxiliary salient pole is interposed between two adjacent salient winding poles;

a greatest common divisor of the number of the magnetic poles of said field member and the number of the salient winding poles differs from the number of the magnetic poles of said field member;

a first group of windings grooves, on one side of the auxiliary salient poles, and a second group of winding grooves on the other side thereof, are formed by said salient winding poles, in which the winding grooves of each group are arranged at an interval, in terms of an electrical angle, of $\frac{2}{3}P\pi$ with P being a number of pairs of magnetic poles of the field member which is not a multiple of three, and in which the first group of the winding grooves is shifted by $\pi/12L$, wherein L is an odd integer in terms of an electrical angle; and wherein each of said salient winding poles has auxiliary grooves on the surface opposite to said field member at positions which are spaced from a position of said grooves, in terms of an electrical angle, by $(\pi/3)K+(\pi/6)K$ with K being an integer.

12. A permanent magnet motor as claimed in claim 11, wherein four magnetic poles are provided, and wherein three winding salient poles and auxiliary grooves are spaced apart from a position of the grooves by $\pi/6$ in terms of an electrical angle.

13. A permanent magnet motor according to claim 12, wherein said armature member is skewed by a pitch of $\pi/12$ in terms of an electrical angle.

14. A perment magnet motor according to claim 11, wherein eight magnetic poles are provided and six winding salient poles, and said auxiliary grooves are spaced apart from a position of said grooves by $(5/6)\pi$ in terms of an electrical angle.

15. A permanent magnet motor according to claim 14, wherein one group of said grooves and said auxiliary grooves separated from one another by a distance of $(5/6)\pi$ are arranged in such a manner so as to shift from the other group by $\frac{1}{4}\pi$ in terms of an electrical angle.

16. A permanent magnet motor according to claim 11, wherein a relationship of $0.5/L<1/S<1.5/L$ exists where ratios of pitches of said auxiliary grooves and said grooves, as located between said magnetic poles, are approximately equal to integers $M_1, M_2, M_3, \ldots M_n$, wherein n equals the total number of said grooves and said auxiliary grooves, over a whole circumference, and wherein L represents a least common multiple between a summation of the integers $$N_R = \sum_{R=1}^{n\alpha} M_R$$

and a number P of said magnetic poles, and where a skew pitch S between said permanent magnet field member and said armature member is 1/S of the whole circumference.

17. A permanent magnet motor according to claim 16, wherein values of 1/S and 1/L are equal.

18. A permanent magnet electric machine according to claim 11, wherein a width of each of said grooves and said auxiliary grooves being substantially n times a period $T_c$ of a cogging torque, with n being an integer.

19. A permanent magnet electric machine according to claim 18, wherein said width W is determined in accordance with the following relationship:

$$nT_c-(0.73T_c/n)<W<nT_c+(0.25T_c/n).$$

* * * * *